United States Patent [19]
Hardy et al.

[11] Patent Number: 6,161,121
[45] Date of Patent: Dec. 12, 2000

[54] GENERIC TRANSFER OF EXCLUSIVE RIGHTS

[75] Inventors: Norman Hardy, Portola Valley; E. Dean Tribble, Los Altos Hills; Mark S. Miller, Los Altos; John D. Corbett; Eric C. Hill, both of Palo Alto; Christopher T. Hibbert, Mountain View, all of Calif.

[73] Assignee: Sun Microsystems, Inc., Mountain View, Calif.

[21] Appl. No.: 08/673,039

[22] Filed: Jul. 1, 1996

[51] Int. Cl.[7] .................................................. G06F 9/00
[52] U.S. Cl. ............................ 709/104; 709/315; 380/4
[58] Field of Search ................................. 395/674, 186, 395/683, 684, 187.01, 200.55; 380/25, 4; 709/104, 315

[56] References Cited

U.S. PATENT DOCUMENTS

| | | | |
|---|---|---|---|
| 4,584,639 | 4/1986 | Hardy | 364/200 |
| 5,457,798 | 10/1995 | Alfredsson | 395/700 |
| 5,553,145 | 9/1996 | Micali | 380/30 |
| 5,615,269 | 3/1997 | Micali | 380/49 |
| 5,640,569 | 6/1997 | Miller et al. | 395/729 |
| 5,692,047 | 11/1997 | McManis | 380/4 |
| 5,740,441 | 4/1998 | Yellin et al. | 395/704 |
| 5,781,633 | 7/1998 | Tribble et al. | 380/25 |
| 5,790,669 | 8/1998 | Miller et al. | 380/25 |
| 5,852,666 | 12/1998 | Miller et al. | 380/4 |

OTHER PUBLICATIONS

C. R. Landau, "Security in a Secure Capability–Based System", Operating Systems Review, Oct. 1989.

A. C. Bomberger, et al, "The KeyKOS Nanokernel Architecture", USENIX, pp. 95–112, Apr. 1992.

R. D. Sansom, et al, "Extending a Capability based System into a Network Environment", ACM, pp. 265–286, 1986.

H. Levy, "Capability and Object–Based System Concept", Key Logic, Digital Press, pp. 1–18, 1984.

KeyKOS Concepts, an Introduction, www.cis.upenn.edu/pub/KeyKOS/public_html/KeyKOS.html.

Codie Wells: A Note on "Protection Imperfect" (1988) 2 pages.

Marc Shapiro, et. al.: Some Key Issues in the Design of Distributed Garbage Collection and References (Apr. 15, 1994) pp. 1–13.

M. Anderson, et al.: A Password–Capability System (1986) The Computer Journal, vol. 29, No. 1.

Andrew Birrell, et al.: Network Objects (SRC Research Reports #115) (Feb. 28, 1994) pp. 1–65.

(List continued on next page.)

*Primary Examiner*—John W. Cabeca
*Assistant Examiner*—Sue Lao
*Attorney, Agent, or Firm*—Steven F. Caserza; Flehr Hohbach Test Albritton and Herbert, LLP

[57] ABSTRACT

A system and method are disclosed that enable exclusive rights in generic goods to be transferred from one party to another. A party holds an exclusive right to a good through a rescindable capability. When two parties agree on a transfer of the exclusive right to the good, a goods description memorializing the agreement is created which is in synergy with the rescindable capability. The goods description includes an acquire method that is the only method that can extract rights from the rescindable capability with which it is in synergy. The object from which the generic right is being transferred sends a message to the recipient with a reference to the rescindable capability. Upon receiving the message, the recipient invokes the acquire method of the referenced goods description, which returns a new rescindable capability that encompasses the generic right just transferred. Once the recipient holds a reference to the new rescindable capability, the sender has had its rights rescinded. Because details of a transfer are implemented between a rescindable capability and a goods description, rights to goods of any type can be transferred. This is useful in escrow transactions, where a trusted third party with no knowledge of goods being exchanged can effect exchanges of exclusive rights to generic goods by two mutually-suspicious parties.

14 Claims, 4 Drawing Sheets

OTHER PUBLICATIONS

Andrew Birrell, et al.: Distributed Garbage Collection for Network Objects (SRC Research Report #116) pp. 1–18.

Norm Hardy, The Confused Deputy (1985) 2 pages.

A. S. Tanenbaum, et al.: Using Sparse Capability in a Distributed Operating System (1986) Proc. Sixth Int'l Conf. On Distributed Computing Systems, IEEE, pp. 558–563.

Robert D. Sansom, et al.: Extending a Capability Based System Into a Network Environment (1986) Research sponsored by DOD, pp. 265–274.

List of Ameoba Papers, 3 pages.

Robert van Renesse, et al.: Wide–Area Communication Under Amoeba (Dec. 1986) IR–117, Vrije Universiteit, pp. 114–126.

Robert van Renesse, et al.: Connecting RPC–Based Distributed Systems Using Wide–Area Networks (1987) Proc. Seventh Int'l Conf. on Distr. Comp. Systems, IEEE, pp. 28–34.

Robert van Renesse, et al.: The Performance of the Amoeba Distributed Operating System (Mar. 1989) Software—Practice and Experience, vol. 19, pp. 223–234.

M. Frans Kaashoek, et al.: Transparent Fault–Tolerance in Parallel Orca Programs (Mar. 1992) Symposium on Experiences with Distributed and Multiprocessor Systems III, Newport Beach, pp. 297–312.

Robert van Renesse, et al.: Voting with Ghosts (1988) Proc. Eighth Int'l. Conf. on Distr. Computer Systems, IEEE, pp. 456–461.

Henri E. Bal: A Comparative Study of Five Parallel Programming Languages (1991) EurOpen Spring 1991 Conference on Open Distributed Systems, Tromso, pp. 209–228.

Henri E. Bal: Replication Techniques for Speeding up Parallel Applications on Distributed Systems (Oct. 1989) IR–202, Vrije Universiteit, pp. 1–19.

Tanenbaum, et al.: An Introduction to Amoeba, Vrije Universiteit, pp. 2–7.

S.J. Mullender, et al.: Amoeba—A Distributed Operating System for the 1990s (May 1990) Computer, Published by IEEE Computer Society, pp. 44–53.

F. Douglis, et al.: A Comparison of Two Distributed Systems: Amoeba and Sprite (Dec. 1991) Computing Systems, vol. 4, No. 3, pp. 353–384.

Henri E. Bal, et al.: Distributed Programming with Shared Data (1988) IEEE Conf. on Computer Languages, IEEE, pp. 82–91.

Henri E. Bal, et al.: Orca: A Language for Distributed Programming (Dec. 1987) IR–140, Vrije Universiteit, pp. 192–199.

G. van Rossum: Ail—A Class–Oriented RPC Stub Generator for Amoeba (1989) Proc. of the Workshop on Experience with Distr. Systems, Springer Verlag, pp. 82–90.

S.J. Mullender: Distributed Operating Systems: State–Of–The–Art and Future Directions (1988) Proc. of the EUTECO 88 Conf., Vienna, Austria, pp. 53–60.

R. van Renesse, et al.: The Design of a High–Performance File Server (1989) Proc. Ninth Int'l Conf. on Distr. Comp. Systems, IEEE, pp. 22–27.

E.H. Baalbergen: Design and Implementation of Parallel Make (Spring 1988) Computing Systems, vol. 1, pp. 135–158.

A.S. Tanenbaum: The Amoeba Distributed Operating System (1993) Vrije Universiteit, 12 pages.

M.F. Kaashoek, et al.: An Efficient Reliable Broadcast Protocol (Oct. 1989) Operating Systems Review, vol. 23, pp. 5–19.

M.F. Kaashoek, et al.: Efficient Reliable Group Communication for Distributed Systems (Jun. 1992) IR–295, Vrije Universiteit, Amsterdam, pp. 1–51.

Overview of Amoeba, pp. 2–13.

C.R. Landau: Security in a Secure Capability–Based System (Oct. 1989) Operating Systems Review, 3 pages.

Sun Microsystems Laboratories, Inc.; SunConnect, Inc., Agorics, Inc.: Real–Time Video Delivery with Market––Based Resource Allocation, pp. 1–25.

Agorics Technical Report ADd004.4P: JOULE: Distributed Application Foundations (Nov. 1994) pp. 1–93.

Netscape Communications Corporation: SSL v3.0: N Standards Documentation (1995), pp.

B.W. Lampson: A Note on the Confinement Problem (1973) ACM, vol. 16, No. 10, 5 pages.

A.S. Tanenbaum: Distributed Operating Systems (1995) Vrije Universiteit, Amsterdam, The Netherlands, (1995) Prentice Hall.

D. Hellman: Weak Table References, five vague descriptions.

Miller, et al.: Markets and Computation: Agoric Open Systems (1988) The Ecology of Computation, pp. 1–44.

USA–Japan Computer Conference Proceedings: Table of Contents (Oct. 1978).

Strom, et al.: Optimistic Recovery: An Asynchronous Approach to Fault–Tolerance in Distributed Systems (Proc. FTCS–14, June 1984) IEEE, pp. 374–379.

Kahn, et al.: Money as a Concurrent Logic Program (1988) pp. 1–23.

S.E. Abdullahi, et al.: Collection Schemes for Distributed Garbage, (Sep. 1992) Int'l. Workshop on Memory Management (IWMM) 92, Springer Verlag, pp. 43–81.

P.B. Bishop: Computers with a Large Address Space and Garbage Collection (May 1977) MIT Lab. for Computer Science (LCS) Technical Rpt. 178, MIT, Cambridge, MA.

W. D. Clinger: Foundations of Actor Semantics (May 1981) MIT, Cambridge, MA.

J.E. Donnelley: Managing Domains in a Network Operating System (1981) Proceedings of the Conference on Local Networks and Distributed Office Systems, Online, pp. 345–361.

C.N.R. Dellar: Removing Backing Store Administration From the Cap Operating System (1980) Operating Systems Review, vol. 14, No. 4, pp. 41–49.

A. Elhabash, et al.: Garbage Collection in an Object Oriented, Distributed, Persistent Environment (1990) ECOOP/OOPSLA '90 Workshop on Garbage Collection.

Hardy U.S. Patent No. 4,584,639 dated Apr. 22, 1986: Computer Security System.

P. Ferreira, et al.: Larchant: Persistence by Reachability in Distributed Shared Memory Through Garbage Collection (May 1996) 16th Intl. Confer. On Distributed Computer Systems (ICDCS) Hong Kong, pp. 1–8.

N. Hardy: KeyKOS Architecture (Sep. 1985) Operating System Review, pp. 1–23.

K. Kahn, et al.: Language Design and Open Systems, The Ecology of Computation (1981), pp. 1–25.

E. Kolodner: Atomic Incremental Garbage Collection and Recovery for Large Stable Heaps Implementing Persistent Object Bases: Principles and Practice, 4th Intl. Workshop on Persistent Object Systems, Morgan Kaufman, San Mateo, CA (1991).

H. Levy: Capability– and Object–Based System Concepts, Digital Press (1984) pp. 1–18.

M.S. Miller, et al.: Logical Secrets, Concurrent Prolog: Collected Papers, vol. 2, MIT Press (1987) pp. 140–161.

J.E.B. Moss: Garbage Collecting Persistent Object Stores, ECOOP/OOPSLA '90 Workshop on Garbage Collection (Oct. 1990) pp. 1–5.

S.J. Mullender: Accounting and Resource Control, Distributed Systems, edited by S.J. Mullender, ACM (1989) pp. 133–145.

D. Plainfosse, et al.: A Survey of Distributed Garbage Collection Techniques, Proceedings of the Intl. Workshop on Memory Management, Kinross, Scotland (Sep. 1995) pp. 211–249.

B. Schneier: Applied Cryptography, Protocols, Algorithms, and Source Code in C.

P.R. Wilson: Uniprocessor Gargage Collection Techniques, Intl. Workshop on Memory Mgmt. (IWMM) 92, Springer Verlag, (Sep. 1992) pp. 1–42.

R.P. Draves, et al.: Using Continuations to Implement Thread Management and Communication in Operating Systems, School of Computer Science, Carnegie Mellon University, Pittsburgh, PA, 15 pages.

R.W. Dean: Using Continuations to Build a User–Level Threads Library, School of Computer Science, Carnegie Mellon University, Pittsburgh, PA, 17 pages.

J.S. Barrera, III: A Fast Mach Network IPC Implementation, School of Computer Science, Carnegie Mellon University, Pittsburgh, PA, 11 pages.

R. Draves: A Revised IPC Interface, (1991) pp. 1–14.

W.S. Frantz, et al.: Object Oriented Transaction Processing in the KeyKOS Microkernel (Sep. 1993) pp. 1–16.

R. Rashid, et al.: Mach: A Foundation for Open Systems, School of Computer Science, Carnegie Mellon University, Pittsburgh, PA, 6 pages.

D.V. Duong: Project Report: Trader Network LRNG 792: Computational Modeling of Social Learning (1995) pp. 1–6.

J.E.B. Moss, et al.: PMOS: A Complete and Coarse–Grained Incremental Garbage Collector for Persistent Object Stores, ECOOP/OOPSLA '90 Workshop on Garbage Collection (1990) pp. 1–13.

P. Bogle, et al.: Reducing Cross Domain Call Overhead Using Batched Futures, OOPSLA 9th Annual Conference (Oct. 23–27, 1994) pp. 341–354.

D. Tribble, et al.: Channels: A Generalization of Streams, Collected Papers, pp. 447–463.

J.S. Auerbach, et al.: High–Level Language Support for Programming Distributed Systems, 1992 Intl. Conference on Computer Languages (Apr. 20–23, 1992), pp. 320–330.

ParcPlace VisualWorks: Chapter 18: Weak Arrays and Finalization, pp. 311–318.

M. Schelvis: Incremental Distribution of Timestamp Packets: A New Approach to Distributed Garbage Collection, Object–Oriented Programming: Systems, Languages and Application, OOPSLA Conference Proceedings, vol. 24, No. 10 (Oct. 1–6, 1989) pp. 37–48.

S.E. Abdullahi, et al.: Collection Schemes for Distributed Garbage, Intl. Workshop on Memory Managment (IWMM) 92, Springer Verlag, pp. 43–81 (Sep. 1992).

R.F. Rashid: From Rig to Accent to Mach: The Evolution of a Network Operating System, Studies in Computer Science and Artificial Intelligence (1988) The Ecology of Computation, North Holland, pp. 207–229.

D.F. Ferguson: The Application of Microeconomics to the Design of Resource Allocation and Control Algorithms, pp. 1–156.

Object Management Group: The Common Object Request Broker: Architecture and Specification (Jul. 1995) sections 1–21.

William A. Wulf, et al.: Hydra/C.mmp—An Experimental Computer System (1981) pp. 1–282, McGraw Hill, NY.

(3a) create(GDP)
(3b) B.foo1(RCP)
(4) GDP.acquire(RCP)

GENERIC TRANSFER OF EXCLUSIVE RIGHTS

The present invention relates generally to communications between computer programs, and, particularly, to systems that allow one program to transfer exclusive rights in generic goods to other programs.

BACKGROUND OF THE INVENTION

There are many computer systems that implement commercial transactions or apply commercial models to internal transactions. Examples of such systems include the "Key-KOS Space Bank", a computer system that allocates a finite supply of memory pages among programs running on the computer system, and the "Fractal Reserve Bank", which handles transfers of fractional reserves (i.e., money) between bank accounts. One characteristic of the aforementioned systems is the need to represent the idea of exclusivity of rights to the goods being traded or allocated. For example, in the KeyKOS Space Bank, where the resource being allocated is a finite supply of memory pages, allocating all of the pages to one process necessarily means that all other page requests must be denied.

This notion of exclusivity of rights inheres to all types of tangible (as opposed to intellectual) property, the physical possession of which excludes another from simultaneous possession of the same property. However, exclusivity is not natural in computer systems, where any number of pointers addressing a particular object can be freely manufactured, essentially conferring universal access to and transfer of rights. The KeyKOS Space Bank and Fractal Reserve systems successfully provided a working computer representation of exclusive rights by providing those rights only in relation to the specific goods being transferred in the respective systems. Thus, the KeyKOS Space Bank provided exclusive, transferrable rights to pages of memory and the Fractal Reserve Bank provided exclusivity with respect to the right to money represented in the computer.

While specific exclusivity is useful in certain contexts, with the increased use of networked computers for commercial transactions (e.g., as automated clearing houses for electronic funds transfers), there exists a need for computer-implemented protocols that permit the generic transfer of exclusive rights (i.e., exclusivity that is not specific to the objects being transferred). For example, generic exclusivity is useful in an escrow situation, where two parties wish to effect a mutual exchange of one type of good for another through a mutually trusted third party, also called an escrow agent. In such a situation, the escrow agent does not need to be aware of the types of all possible goods that could be involved in possible transfers. Rather, the escrow agent simply needs to know how to facilitate the secure transfer of whatever goods the parties agreed to transfer. Consequently, there is a need for a computer system and method that provides for the generic transfer of exclusive rights to goods represented therein.

SUMMARY OF THE INVENTION

The present invention is a system and method that meets the needs set out above. More particularly, the present invention is a system that enables the generic transfer of exclusive rights between first and second parties in agreement as to a generic right to be transferred from the first party to the second party.

Initially, the first party holds an existing rescindable capability to the generic right (hereinafter, "the good") to be transferred. The existing rescindable capability represents a particular instance of the good to be transferred which is in possession of the first party. This capability itself may be shared between the first party and others, and so does not necessarily represent an exclusive right in the sense of a right held only be the first party. A goods description is implemented by the implementor of the good (so it's trusted and can have access to the private state of the good's implementation) and generically represents an amount of the good that the two parties have agreed to transfer. Goods description objects have an acquire method (which takes a particular instance of the good as an argument) that is configured to create a new rescindable capability, transfer the rights from the existing rescindable capability to the new capability and return the new capability to its caller.

When two parties have reached an agreement to transfer ownership of a transferable good (represented by agreeing on a goods description), the first party sends the transferrable good (i.e., the existing rescindable capability) to the second party. The second party invokes the goods description's acquire method on the received good, which results in the second party gaining exclusive possession of the rights of the transferred good, which the second party holds through the new rescindable capability.

In a preferred embodiment of the present invention, all or part of the generic rights held by the first party can be transferred to the second party.

BRIEF DESCRIPTION OF THE DRAWINGS

Additional objects and features of the invention will be more readily apparent from the following detailed description and appended claims when taken in conjunction with the drawings, in which:

DESCRIPTION OF THE PREFERRED EMBODIMENT

Figure 1A:
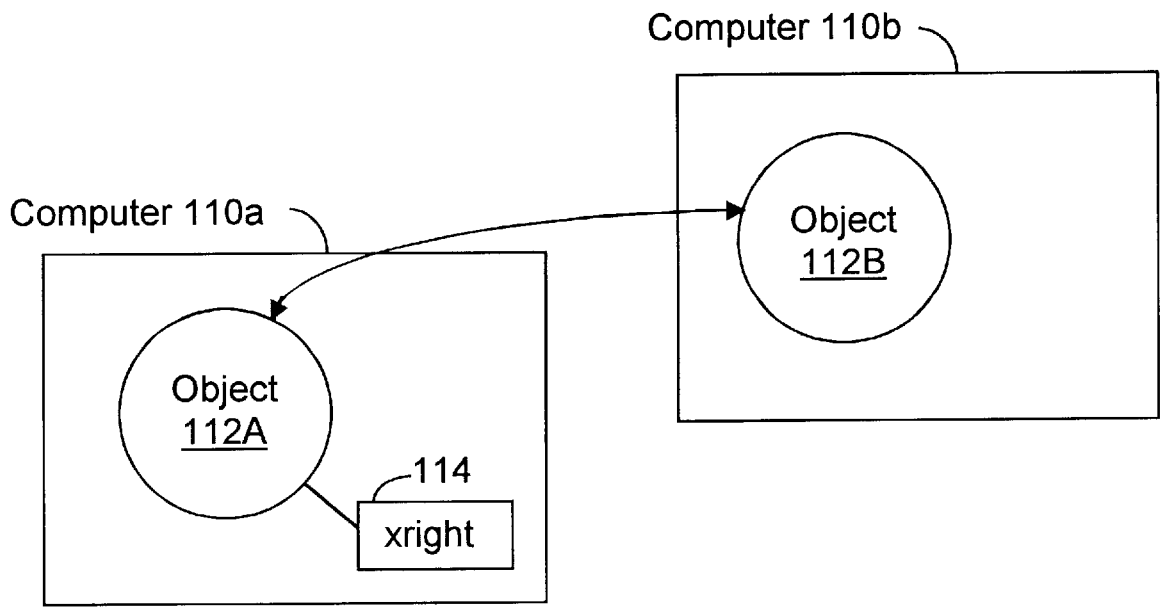
FIG. 1A depicts the state of a computer system in which two mutually-suspicious parties A and B are in communication within a framework providing capability security and in which party A is preparing to transfer exclusive rights to a good to object B.
Figure 1B:
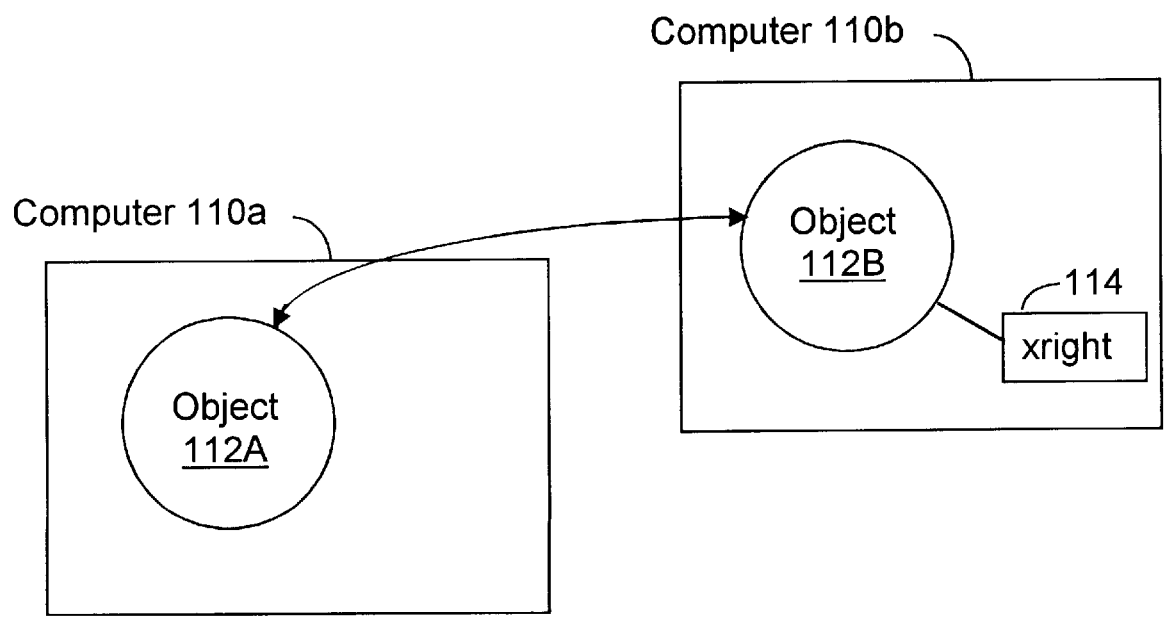
FIG. 1B depicts the state of the system of FIG. 1A in which exclusive rights to good P have been transferred to party B.

Referring to FIGS. 1A and 1B, there is shown the problem to which the present invention is addressed. In FIG. 1A two mutually-suspicious parties A 112A and B 112B, executing respectively in computers 110a and 110b, have agreed that party A 112A will transfer to party B 112B exclusive rights (xright) 114 held by party A 112A to a particular good. In FIG. 1B, the transfer has been completed, meaning that party B 112B now holds the exclusive right 114 to the good previously held by A 112A. The present invention implements such transfers for goods of any type. For example, the present invention is adaptable to allow parties A and B to transfer exclusive rights to pages of memory, money or printer time. Note that the problem shown for multiple computers in FIGS. 1A and 1B exists in many other contexts, including between two parties executing in different processes but on the same computer or between two parties executing within a single process.

Figure 2:
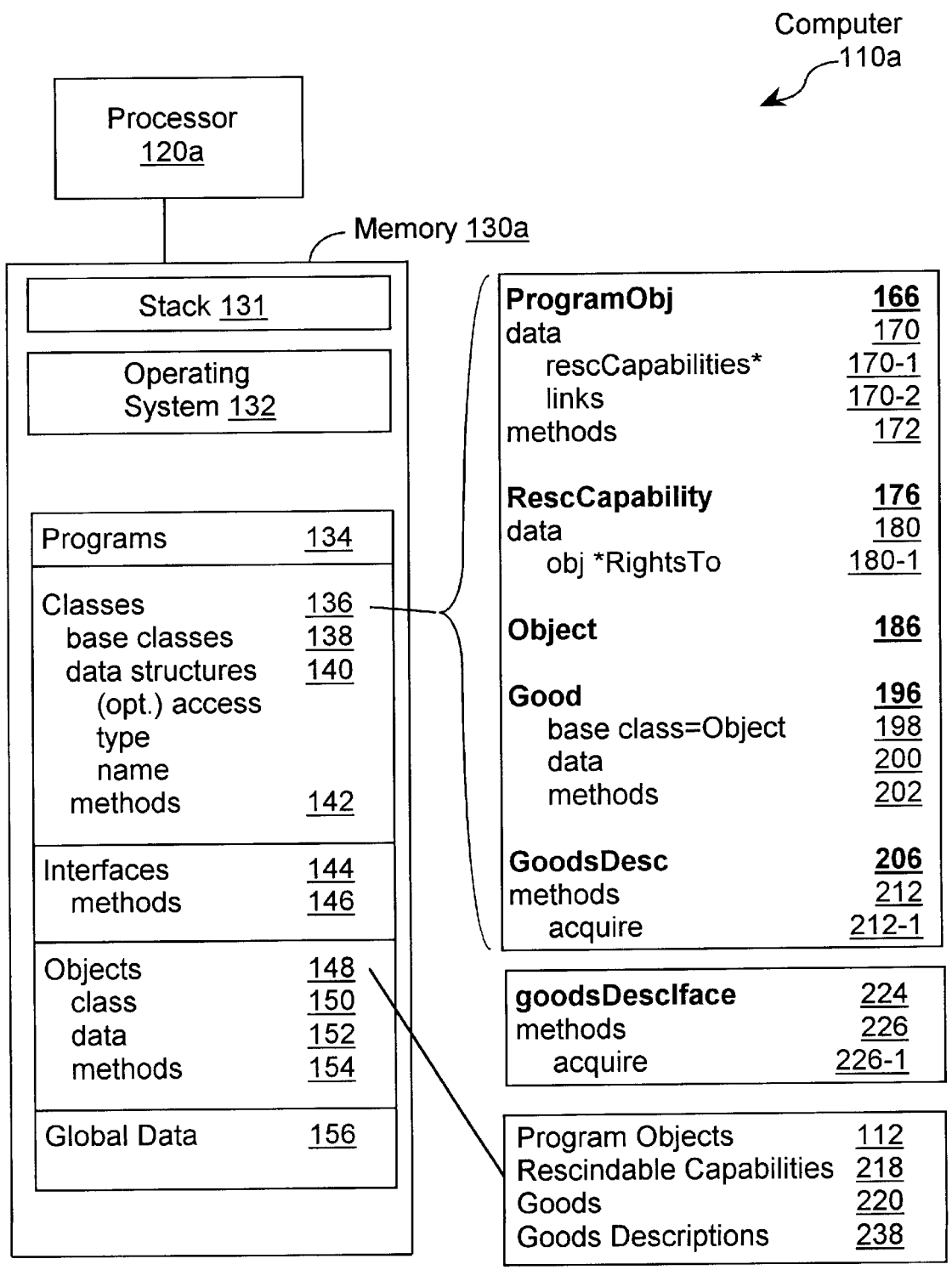
FIG. 2 is a block diagram of a computer system in which the present invention is implemented.

The preferred embodiment of the present invention, which is described in reference to FIG. 2, is implemented as a set of Java classes that are common to all objects in a computer system implemented on one or more computers 110 which need to transfer exclusive rights to generic goods (i.e., where the type of the goods/rights can vary). The teachings of the present invention and the preferred embodiment are equally adaptable to implementation in other languages that provide capability security (such as Joule, Actors, Scheme). The teaching of the present invention could also be applied to conventional programming languages (such as C) if they execute in a capability security system, such as an operating system.

Referring to FIG. 2, there is shown a block diagram of a computer 110*a* (corresponding to any of the machines from FIG. 1) in which the preferred embodiment of the present invention is implemented. The computer 110*a* includes a processor 120*a* and a memory 130*a*. The memory 130*a* could be a fast primary memory, such as a random access memory; a cache memory; a slower secondary memory, such as a hard disk; or any combination of those three types of memory. Details of these software and hardware components are now presented for the representative computer 110*a*.

The memory 130*a* of the computer 110*a* includes stacks 131 used by threads created by the programs 134 and an operating system 132. The memory 130*a* also includes storage and definitions for building blocks used by the programs 134, including class definitions 136, interface definitions 144, object instances 148 of the classes 136 and global data 164. The operating system 132 executes in the processor 120 as long as the computer 110 is operational and provides system services for the processor 120 and programs 134 being executed in the processor 120. The programs 134 can be any kind of program, including the object-oriented programs to which the present application is directed.

As is well known, a program 134 written in an object-oriented language, such as C++ or Java, includes class definitions 136 and object declarations 148. Each class definition 136 outlines the data structures 140 and methods 142 associated with that class. A data structure declaration 140 defines the type of the data item (e.g., whether the data item is a structure, an integer, or a user-defined type) and optionally, the accessibility of the data item (i.e., whether the data item is public, meaning accessible to all objects, or private, meaning visible only within object instances of the declared class). A class definition 136 can also optionally identify one or more base classes 138 from which that class inherits methods and data structures.

The objects 148 are instances of one or more classes 136 and incorporate all of the properties (i.e., methods and data structures) of the classes of which they are instances. In contrast to the classes 136, which, in most object-oriented languages, are defined at compile-time, the objects 148 are run-time entities that, in response to messages received from the programs 134 or another object 148, execute their methods and update their own data as a part of program execution. Each object's storage 148 includes a "class" field 150 that indicates the associated classes of which the particular object 148 is an instance and the data 152 derived from those associated classes. The object's methods are not held in the object storage 154, but in the associated class 136. Referring to FIG. 2, the class of which a particular object is an instance is represented with a descriptor to the left of the instance identifier. Thus, the preferred embodiment includes the following objects 148:

program objects 112 (instances of a variety of classes that make up the various programs 134), rescindable capabilities 218 (instances of the RescCapability classes 176), goods 220 (instances of the Good classes 196); and goods descriptions 238 (instances of the GoodsDesc classes 206).

These classes 176, 196, 206 are now described.

Each instance 218*x* of a RescCapability class 176*x* (where "x" represents a particular class of good) addressed by a program object represents a rescindable, exclusive right to a particular good of type x. In the preferred embodiment, a RescCapability instance 218*x* acts as an intermediary between a program object instance 112 of the ProgramObj class 166 that holds a rescindable exclusive right to use/access a particular good of type x and the particular good. This level of indirection between ProgramObj instances 112 and goods 220 is what allows rights to be made rescindable in the present invention.

Accordingly, a RescCapability class 176 has data structures 180 that include a pointer ("RightsTo") 180-1 to the object instance to which a particular RescCapability instance represents the rescindable, exclusive right of access. In the preferred embodiment, these object instances include goods 220*x*, each of which is an instance of a particular goods class 196*x*. Each goods class 196*x* can include data 200*x* and methods 202*x* that describe the good. For example a "RawPage" good class 196P (not shown) would include data structures 200P and methods 202M that describe attributes of a page of memory and a "Money" good class 196M would have data structures 200M and methods 202M that describe the attributes of money. The classes 196P and 196M shall be employed in an example illustrating the operation of the preferred embodiment in reference to FIGS. 3 and 4.

A pseudo-Java code representation of a Page class 176P, which represents rescindable rights to page goods 220P (also referred to as "RawPages") is shown in Example 1.

EXAMPLE 1

Pseudocode for Page Class 176P

```
public final class Page implements RescCapability {
    public byte read (int addr) {
        return myRawPage.read(addr);
    }
    RawPage myRawPage;
    Page(RawPage rp) {
        myRawPage := rp;
    }
}
```

The first line of Example 1, using standard Java terminology, declares "Page" 176P to be a public, final class that implements the RescCapability interface 234. In Java, declaring a class as "public" means that it is accessible to other classes in other packages (i.e., class libraries). Declaring a class to be "final" means that the class cannot be subclassed (i.e., it is not possible to derive classes from the Page class 176P). All RescCapability classes 176 are declared "final" in the preferred embodiment for security reasons that are explained below.

The Page class 176P in Example 1 defines a "read" method that returns a byte of data stored at the memory page address provided in the integer argument "addr". The Page class 176P includes a write method, which is not described herein. The class 176P also defines an instance variable "myRawPage" of class RawPage 196P that is held by each Page class instance 218P. This instance variable is equivalent to the "RightsTo" pointer 180-1 described in reference to FIG. 2 and references the RawPage instance 220P encompassed by a Page instance. When called, the Page.read method invokes the read method of its private "myRawPage" object, which reads out the byte at the correct memory address. The one-to-one correspondence between Page objects and memory objects (i.e., one RawPage object is associated with exactly one Page and a Page object is associated with at most one RawPage object) enables the present invention to provide exclusive rights to memory pages. I.e., exclusive access to a good cannot be provided unless it is certain that another object cannot simultaneously hold access to the good. Other goods classes 196x are similarly defined so that the one-to-one relationship between goods classes 196x and actual goods (or representations of goods) is maintained. Moreover, because a RescCapability class 176 insulates a good from other objects (except from a GoodsDesc instance), it must, at a minimum, be responsive to all of the good's messages. For example, even though it can't actually read out the value at a memory location, the Page class 176 must respond to a read message by forwarding the message to its RawPage instance 220P rather than making the RawPage available to its clients. Were it to do the latter, in the embodiment described the right to invoke the RawPage operations would no longer be rescindable.

As mentioned above, the preferred embodiment also includes a set of goods description classes ("GoodsDesc") 206. A GoodsDesc class 206x provides methods that interact with instances of its corresponding goods class 196x in ways no other object can. Each GoodsDesc class 206 implements (i.e., conforms to) a GoodsDesc interface 224 that defines the syntax (but not code) of the methods 212 common to all goods description classes 206. In particular, the GoodsDesc interface 224 defines the syntax of an acquire method 226-1 that is implemented (as an acquire method 212x-1) in each particular goods description class 206x. Each acquire method 212x-1 when invoked acquires part or all of a good associated with its GoodsDesc class 206x to which exclusive rights are held through an instance 218x of a RescCapability class 176x and returns a new RescCapability instance 218x' of the same type (that includes the acquired rights) to the acquirer. For example, the acquire method 212P-1 of a page goods description ("PageDesc") class 206P is configured to acquire rescindable capabilities to memory pages.

In the present invention "synergy" exists between an instance of a goods description class 206x and an instance of its corresponding RescCapability class 176x. Synergy is what allows a goods description instance to do things to the goods encompassed by a RescCapability instance 218 that no other class instance could do (namely, acquire part or all of its goods). How synergy is provided in the present invention is described in reference to Examples 2 and 3, which show Java pseudocode examples of the GoodsDesc interface 224 and the page goods description class ("PageDesc") 206P.

EXAMPLE 2

Pseudocode for GoodsDesc Interface 224

```
interface GoodsDesc {
    public RescCapability acquire (RescCapability arg);
}
```

EXAMPLE 3

Pseudocode for PageDesc Class 206P

```
public final class PageDesc implements GoodsDesc {
    public RescCapability acquire (RescCapability arg) {
        if (!arg instanceof Page) {
            return null;
        }
        Page p := (Page)arg;
        Page result := new Page (p.myRawPage)
        p.myRawPage:=null;
        return result;
    }
}
```

The GoodsDesc interface 224 defines an acquire method interface 226-1 as returning a RescCapability 176 and as being called with an argument that is also a RescCapability. Accordingly, the PageDesc class 206P has the same types of argument and return values (i.e., in Example 3, the acquire method is defined as "public RescCapability acquire (RescCapability arg)". However, the acquire method 212P-1 is implemented in a way that is specific to RawPages 220P. Most importantly, this acquire method implementation ensures that the acquire method 212P-1 only operates on instances of the Page class 176P.

This important property is secured by the first three lines of the acquire method of Example 3 (i.e., "if(!arg . . . ) { . . . }"). The first line applies the Java "instanceof" operation to the argument "arg" passed into the acquire method. This operation determines whether the object being examined is an instance of a particular class, in this case the class "Page". If the argument is not a Page, the acquire method returns null, to indicate that the rights could not be acquired.

If the argument is indeed a Page, then the narrow operation (a common object oriented programming language "type casting" operation) on the fourth line of the method—written "(Page)arg"—will succeed, returning the same reference already held by "arg", but now with a static type of "Page". This value is held onto by the variable "p".

In the fifth and sixth lines of the method, "p.myRawPage" is being respectively read and written. How can this happen when "myRawPage" is not declared "public" in class "Page"? By the rules of Java this can only happen when the PageDesc class 206P and the Page class 176P are defined with the same "package". Java terminology defines a "package" as a group of related classes and interfaces which by default, are only accessible to other classes within its package. In Java, by being in the same package, a Goods Description class object 206 (in this case PageDesc) can access certain parts of a Rescindable Capability class object (in this case Page) that are denied to all code that is not part of the package. This is used in the above example to bring about "synergy", an effect that results only from bringing together two capabilities that designate two objects that have special access to each other. This is only a valid secure synergy technique when Java is supplemented with some mechanism that prevents new code being added to a package that is not trusted by the code already in the package.

In order to bring about secure generic transfer of exclusive rights, some technique must be employed to bring about synergy between a particular kind of RescCapability 176 (e.g., Page) and the corresponding kind of GoodsDesc 206 (e.g., PageDesc). There are a variety of techniques for bringing about synergy (e.g., see KeyKOS, Joule, Logical Secrets, Money as a Concurrent Logic Program). The technique being illustrated is a preferred embodiment of synergy for Java under certain conditions, but the invention is in no way specific to which technique is used to bring about synergy.

In Example 3, assuming that the RescCapability passed to the acquire method 212P-1 is a Page instance 218P, a new instance ("result") of the Page class 176P is created in the statement "Page result:=new Page (p.myRawPage). The Page constructor (i.e., "new Page") copies p's myRawPage data ("p.myRawPage") to the new Page instance "result". Of course, at this point in the acquire method, the object "p" is still holding onto its myRawPage data. So that the transfer of the page can be made exclusive, in the next to last line of Example 3 p's myRawPage data is nulled out (p.myRawPage=null), which essentially completes the exclusive transfer of rights formerly held by p to the new Page instance "result". Once this exclusive transfer has been completed, "result" (a new Page object 218P' with exclusive rights to the page of memory formerly associated with the Page passed to acquire) is returned to the calling object. I.e., the acquire method has verified the class membership of its argument and has acquired the exclusive rights to a page of memory (myRawPage) once held by the argument.

Using this object and class infrastructure the party B 112B and the party A 112A can perform an agreement wherein A 112A has agreed to transfer to B 112B exclusive rights to a page of memory ("P") 220P (an instance of the RawPage class 196P) to which A holds rescindable, exclusive rights. How this is accomplished is now described in reference to FIG. 3, which consists of FIGS. 3A, 3B and 3C.

Figure 3A:
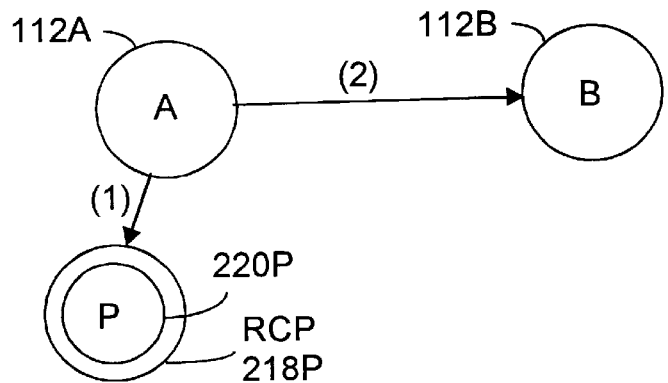
FIG. 3A depicts the structures of the preferred embodiment which are used to represent the situation of FIG. 1A.
Figure 3B:
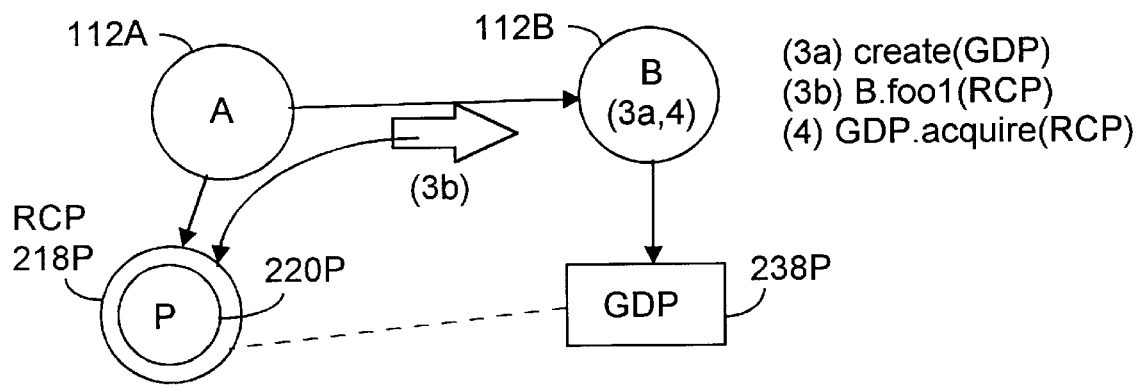
FIG. 3B illustrates the steps by which objects A and B, implemented in accordance with the preferred embodiment, set up the transfer of A's rescindable, exclusive rights to good P to B.
Figure 3C:
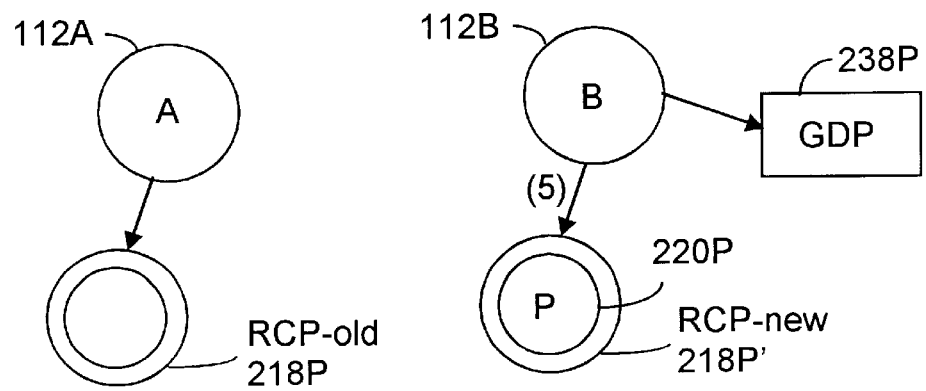
FIG. 3C illustrates the completion of the transfer of exclusive rights between A and B.

FIGS. 3A, 3B and 3C collectively illustrate a series of steps by which the aforementioned transfer is performed. In these figures (and in FIG. 4A and 4B), an exclusive, rescindable capability 218x and the good 220x to which it pertains are represented by a pair of concentric circles where the outer circle represents the rescindable capability 218x and the inner the good 220x. For example, referring to FIG. 3A, a rescindable capability Page 218P (an instance of the class Page 176P) held by party A 112A encompasses the RawPage P 220P. Note that the pointer 170A-1 held by the party A 112A to the Page 218P does not touch the RawPage P 220P. This configuration shows that the party 112A does not directly hold on to the RawPage 220P, but does so indirectly, through the Page 218P.

The order in which messages are issued and actions are performed by the objects in these figures is shown by the indices enclosed in parentheses. For example, in FIG. 3A, the party A 112A initially holds references 170A-1 to Page 218P (1) and 170A-2 to party B 112B (2). Some of the messages involve passing a reference or references. These messages are illustrated with a hollow arrow that is directed from the sender to the recipient and holds pointers emanating therefrom to the referenced objects. For example, in FIG. 3B, the message (3) includes a reference to Page 218. Indexed messages or actions other than the simple holding of a reference are annotated in the margins of each figure. Thus, FIG. 3B shows the pseudocode description of the messages and actions (3) and (4).

As of the point in the transfer shown in FIG. 3B, the parties A and B have agreed that A will transfer to B all of A's rescindable exclusive rights (held by A through the Page 218P) to the good P 220P. Once the agreement is made, party B uses a page goods description object ("GDP) 238P that is in synergy (represented as a dashed line) with the Page 218P. B must trust that the goods description GDP 238P will not only grant these rights, but rescind these rights from all others.

This goods description GDP 238P may be trusted by B 112B for any of several reasons:

1. B may have been constructed already knowing the particular goods description as one that it should trust;
2. B may get it (i.e., the goods description) in a message from an object that it already trusts, where the meaning of the particular message includes that this pre-existing trust should be extended to the goods description;
3. B may obtain a reference to a goods description by means that do not imply trust, but then ask another object that it already does trust and that is in synergy with certain goods descriptions whether the goods description should be trusted;
4. B may use a platform primitive, such as "instanceof" or a narrow operation, to check that the goods description is a particular implementation that it trusts; and
5. B may grant the goods description the benefit of the doubt for inconsequential transactions, and come to invest more trust in it over time as it continues to seem trustworthy.

Then, the party A 112A issues a message (3) to party B 112B relaying the address of the Page 218P. This message is represented as "B.transfer(Page)", where "B" is the message destination, "transfer" is the name of the message and "Page" is the address of the rescindable capability instance 218P being passed.

After receiving the message (3), party B 112B attempts to acquire the agreed-upon rights to the page of memory P 220P. Party B 112B does this by invoking (4) the acquire message of the GDP 238P on the Page 218P passed in the transfer message. This message is represented as "GDP.acquire(Page)". The outcome of the execution of the acquire method 212P-1 are shown in FIG. 3C.

Because the Page 218P is an instance of the Page class 176P, the acquire method 212P-1 successfully returns to B 112B a new Page instance Page-new 218P' that represents an exclusive right to the page of memory P 220P transferred from the old Page 218P. As shown in FIG. 3C, B 112B does not hold the page P 220P directly, but via the rescindable capability Page-new 218P'.

The preceding description assumes that A 112A is transferring all of its exclusive rights to the good P 220P to B 112B. However, the situation commonly arises where a party, such as A 112A, needs only to transfer a portion of its rights.

For example, the party A 112A might make available to the party B 112B the ability to acquire up to ten dollars ($10) in order to pay to use some service that B is to provide, and then only consume four dollars ($4) worth of B's service (in B's estimation). This is an example of why B might acquire exclusivity on only a subset of the rights made available to it, and why A may be willing to make available the ability to exclusively acquire more rights than are actually taken.

In this example, the good would correspond to $10. Since B 112B needs 4$, it creates a goods description with an acquire method that only transfers from A 112A the rescindable capability to $4. Thus, after the transfer has been completed, B has exclusive rights to $4 and A and B share access to a rescindable capability that is the exclusive holder of the remaining six dollars ($6). Once A considers the transaction complete, it can engage in this same procedure yet again to regain exclusive access to the remaining money.

Thus, the present invention allows two parties to agree to a transfer of exclusive rights and implement that transfer in a way that guarantees that the transfer occurs. Moreover, due to the synergy between GoodsDesc instances and RescCapability instances, the present invention can be used to transfer exclusive rights to any kind of goods for which exclusive rights can be represented in a computer. For example, the present invention is adaptable to the situation shown in FIG. 4A and 4B, where two mutually-suspicious parties A 112A and B 112B exchange exclusive rights to page goods P 220P held by A for exclusive rights to money goods M 220M held by B.

Figure 4A:
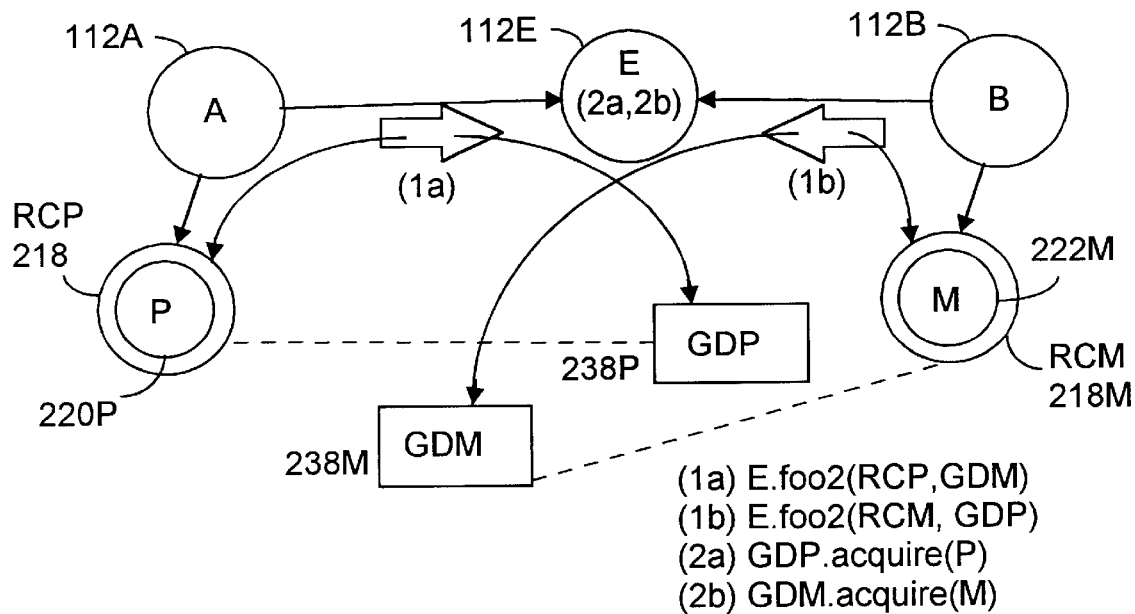
FIG. 4A illustrates how the preferred embodiment can be applied to an escrow situation wherein A and B wish to trade their respective goods P for goods D using an escrow agent E.

Referring to FIG. 4A, the situation just described is illustrated using the notation of FIGS. 3A, 3B and 3C. In FIG. 4A, the two parties A 112A and B 112B have already agreed that A is to transfer page goods P 220P to B in return for money goods M 220M. As in many commercial transactions between mutually-suspicious participants, A and B have agreed to accomplish this transaction through a trusted escrow agent E 112E. To effect the transfer, trusted goods descriptions 238P and 238M have been created respectively by B 112B and A 112A, each of which is in synergy with a corresponding RescCapability instance 218. I.e., as indicated by the dashed lines, the GDP 238P is in synergy with the Page 218P and the GDM 238M is in synergy with the Money 218M.

As one of the first steps in effecting the transfer, party A 112A sends the escrow agent a message "post(Page, GDM)" (1a) that includes references to the rescindable capability Page through which A holds P 220P and the goods description GDM that can acquire the money goods M 220M that A has bargained for in return for the page P 220P. Party B 112A sends the escrow agent a similar message "post (Money, GDP)" (1b) that includes references to the rescindable capability Money through which B holds M 220M and the goods description GDP that can acquire the page goods P 220P that B has bargained for in return for the money M 220M. Once it has received both "post" messages, the escrow agent invokes (2a, 2b) the acquire methods of both goods descriptions GDP 238P and GDM 238M, the operation of which has been described in reference to FIGS. 3A, 3B and 3C.

Figure 4B:
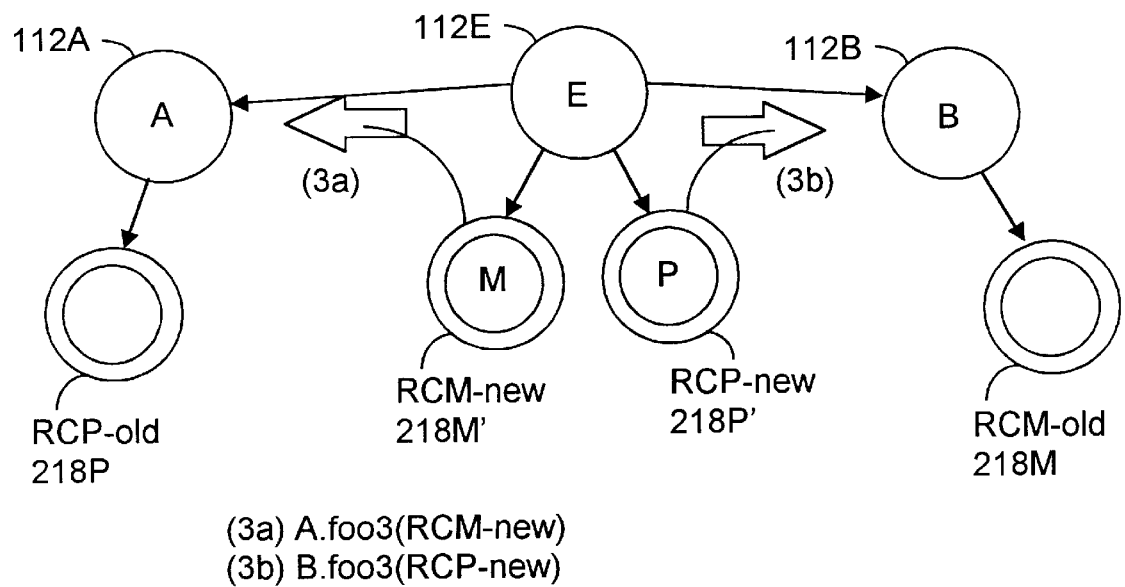
FIG. 4B illustrates the completion of the escrow operation of FIG. 4A.

Referring to FIG. 4B, assuming that each invoked acquire method was successful, each would return to the escrow agent 112E a respective new rescindable capability holding a respective transferred right. Thus, following steps 2a and 2b, the escrow agent 112E holds references to a Money-new 218M' that holds on to the rights 220M formerly exclusively held by party B 112B and to a Page-new 218P' that holds on to the rights 220P formerly exclusively held by party A 112A. Note that the escrow agent 112E is not concerned about the type of goods for which rights are being transferred. That is only a concern of the goods description objects 238, which actually acquire rights. Rather, the escrow agent 112E is only concerned that each party to the transaction has provided it with the agreed goods as represented by a non-null return value from the respective acquire methods.

Assuming that each acquire method has returned a non-null value, the escrow agent E 112E completes the agreed exchange by issuing "accept" messages to party A 112A and party B 112B. The accept message issued to party A 112A "accept(Money-new)" passes the new rescindable capability Money-new 218M' to A that encompasses rights to the money 220M transferred from party B 112B. The accept message issued to party B 112B "accept(Page-new)" passes the new rescindable capability Page-new 218P' to B that encompasses rights to the page 220P transferred from party A 112A. An important aspect of these transfers as performed in the present invention is that at no time does an object with a rescindable right to a good ever directly hold on to the good. This is what enables true rescindability.

Thus, the present invention, which enables the transfer of exclusive rights to generic goods, has wide applications in electronic commerce. The present invention also is applicable to the management of computer systems, where, for example, the exclusive rights to access different computer system resources can be transferred directly, or (when the parties to an exchange are mutually mistrustful) transferred via trusted escrow agents who need to know nothing about the goods being transferred.

While the present invention has been described with reference to a few specific embodiments, the description is illustrative of the invention and is not to be construed as limiting the invention. Various modifications may occur to those skilled in the art without departing from the true spirit and scope of the invention as defined by the appended claims.

What is claimed is:

1. A system that provides generic transfer of exclusive rights, comprising:

a rescindable right to part or all of a generic good represented as a first program object encapsulating said rescindable right;

a first party having rescindable possession of said rescindable right, holding a pointer to said first program object and not said rescindable right;

a third program object able to do legitimately to said rescindable right what no other entity can legitimately do, said third program object memorializing an agreement between first and second parties that said rescindable right is to be transferred from said first party to said second party;

a second program object being configured to encapsulate said rescindable right;

said third program object being configured to implement said agreement by transferring said rescindable right from said first program object to said second program object; said second party exclusively holding said rescindable right indirectly through said second program object and said third program object ensuring that said first program object no longer encapsulates said rescindable right following said transfer.

2. The system of claim 1, wherein:

said first program object comprises an existing rescindable capability to said rescindable right;

said second program object comprises a new rescindable capability to said rescindable right;

said third program object comprises a goods description representing exclusive possession of said rescindable right, said goods description being in synergy with said existing rescindable capability;

said system further comprising:
  an exclusive transfer message transmitted by said first party to said second party including a reference to said existing rescindable capability;
  said second party being configured, following receipt of said transfer message, to invoke an acquirer provided by said goods description on said existing rescindable capability, said acquirer being configured to:
    create said new rescindable capability associated with said second party; and
    transfer said rescindable right from said existing rescindable capability to said new rescindable capability;
    thereby granting said second party rescindable, exclusive possession of said rescindable right.

3. The system of claim 2, wherein:
said existing rescindable capability is to an amount N of said rescindable right;
said first and second parties being in agreement to transfer at most an amount M of said rescindable right;
said goods description representing exclusive possession of said amount M of said rescindable right, where M is not greater than N;
said acquirer being configured to transfer said amount M of said rescindable right to said new rescindable capability, leaving said existing rescindable capability with access to an amount N−M of said rescindable right.

4. The system of claim 3 wherein said existing and new rescindable capabilities, said first and second parties and said goods description are implemented as objects; said goods description being associated with said rescindable right being transferred; said synergy being provided by said acquirer being configured to verify upon its execution that said rescindable capability is to said rescindable right; the existence of said synergy enabling said acquirer to have greater rights to said existing rescindable capability than other objects.

5. The system of claim 4, wherein said existing and said new rescindable capabilities, said goods description and said first and second parties are instances of Java classes and said goods description implements a Java goods description interface, said synergy being provided by a Java narrow operation executed within said acquirer that only returns a value when the object passed to said narrow operation has a type selected from the same or narrower type as the object type specified in said narrow operation, said specified object type being the type of said rescindable capability.

6. The system of claim 2, wherein said first and second parties are in agreement as to a first generic right to be transferred from said first party to said second party in exchange for a second generic right to be transferred from said second party to said first party; further comprising:
  a post message supported by said first and second parties;
  a trusted third party that is configured to respond to said post message;
  a first existing rescindable capability encapsulating said first generic right in possession of said first party;
  a first trusted goods description representing exclusive possession of said first generic right, said first goods description being in synergy with said first existing rescindable capability;
  a second existing rescindable capability encapsulating said second generic right in possession of said second party;
  a second trusted goods description representing exclusive possession of said second generic right, said second goods description being in synergy with said second existing rescindable capability;
  said first and second parties being configured to initiate said exchange by issuing respective post messages to said trusted third party, a first post message from said first party referencing said first existing rescindable capability and said second goods description and a second post message from said second party referencing said second existing rescindable capability and said first goods description;
  said third party upon receiving said first and second post messages being configured to acquire using respective acquirers of said goods descriptions exclusive possession of said first and second generic rights and, when both rights have been acquired, transfer said exclusive possession of said first generic right to said second party and exclusive possession of said second generic right to said first party.

7. The system of claim 6, wherein said exclusive possession of said first and second generic rights comprises the holding of respective references to first and second new rescindable capabilities encompassing said first and second generic rights acquired by said respective acquirers; further comprising:
  an accept message supported by said parties that includes a reference to a rescindable capability;
  said third party being configured to transfer said exclusive possession of said exclusive rights by issuing to said first party a first accept message including a reference to said first new rescindable capability and to said second party a second accept message including a reference to said second new rescindable capability, said third party being unable to retain any of said first and second generic rights following its issuance of said accept messages.

8. A method for providing generic transfer of exclusive rights, comprising the steps of:
  representing a rescindable exclusive right to a generic good as a wrapper encapsulating said right;
  granting only to a party in exclusive possession of said right access to said wrapper and not said right, no other parties having access to said wrapper;
  transferring said right from a first party in exclusive possession of said right to a second party via a privileged entity able to do legitimately to said encapsulated right what no other entity can legitimately do;
  said privileged entity carrying out said transferring by creating a new wrapper encapsulating said right and ensuring that neither the existing wrapper nor any other pre-existing wrapper any longer encapsulates said rights.

9. The method of claim 8, wherein:
said wrapper comprises an existing rescindable capability to said generic right;
said new wrapper comprises a new rescindable capability to said generic right;
said privileged entity comprises a goods description in synergy with said existing rescindable capability; and
said transferring step comprises:
  transmitting to said second party a reference to said existing rescindable capability;
  said second party receiving said reference and subsequently invoking an acquire method provided by said goods description on said existing rescindable capability; said acquire method returning to said second party said new rescindable capability, which exclusively encapsulates said generic right.

10. The method of claim 9, wherein:

said existing rescindable capability is to an amount N of said generic right;

said first and second parties being in agreement to transfer at most an amount M of said generic right; and said goods description representing exclusive possession of said amount M of said generic right, where M is not greater than N;

said acquire method transferring said amount M of said generic right to said new rescindable capability when invoked on said existing rescindable capability, leaving said existing rescindable capability with access to an amount N−M of said generic right.

11. The method of claim 10, wherein said acquire method implements said synergy by verifying upon its execution that said rescindable capability is to said generic right being transferred; the existence of said synergy enabling said acquirer to have greater rights to said rescindable capability than other objects.

12. The method of claim 11, wherein said existing and new rescindable capabilities, said goods description and said first and second parties are instances of Java classes and said goods description implements a Java goods description interface, said synergy being provided by a Java narrow operation executed by said acquire method that only returns a value when an object passed to said narrow operation has a type selected from the same or narrower type as a narrowing type specified in said narrow operation, said specified narrowing type being the type of said rescindable capability.

13. The method of claim 9, wherein said first and second parties are in agreement as to a first generic right to be transferred from said first party to said second party in exchange for a second generic right to be transferred from said second party to said first party; further comprising the steps of:

representing with a first existing rescindable capability said first generic right in possession of said first party;

representing with a first trusted goods description exclusive possession of said first right, said first goods description being in synergy with said first existing rescindable capability;

representing with a second existing rescindable capability to said second generic right in possession of said second party;

representing with a second trusted goods description exclusive possession of said second right, said second goods description being in synergy with said second existing rescindable capability;

said first and second parties initiating said exchange by issuing respective post messages to a trusted third party, a first post message from said first party referencing said first existing rescindable capability and said second goods description and a second post message from said second party referencing said second existing rescindable capability and said first goods description;

said third party upon receiving said first and second post messages acquiring using respective acquire methods of said goods descriptions exclusive possession of said first and second generic rights and, when both rights have been acquired, transferring said exclusive possession of said first right to said second party and exclusive possession of said second right to said first party.

14. The method of claim 13, further comprising the steps of:

representing said exclusive possession of said first and second generic rights through the holding of respective references to first and second new capabilities encompassing said first and second generic rights acquired by said respective acquire methods;

said third party transferring said exclusive possession of said exclusive rights by issuing to said first party a first accept message including a reference to said first new capability and to said second party a second accept message including a reference to said second new capability, said third party being unable to retain any of said first and second generic rights following its issuance of said accept messages.

* * * * *